(12) United States Patent
Roybal et al.

(10) Patent No.: US 9,942,398 B2
(45) Date of Patent: Apr. 10, 2018

(54) JUST-IN TIME DATA POSITIONING FOR CUSTOMER SERVICE INTERACTIONS

(71) Applicant: AT&T Intellectual Property I, L.P., Atlanta, GA (US)

(72) Inventors: Michael Roybal, Woodinville, WA (US); Jennifer Songer, Robertsville, MO (US); Michael Morgan, Grand Prairie, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/613,201

(22) Filed: Feb. 3, 2015

(65) Prior Publication Data

US 2016/0227037 A1 Aug. 4, 2016

(51) Int. Cl.
*H04M 3/00* (2006.01)
*H04M 3/51* (2006.01)

(52) U.S. Cl.
CPC ................................. *H04M 3/5166* (2013.01)

(58) Field of Classification Search
CPC ................................................. H04M 2203/40
USPC ....... 379/265.01–265.14, 266.01–266.1, 309
See application file for complete search history.

(56) References Cited

U.S. PATENT DOCUMENTS

| | | | |
|---|---|---|---|
| 6,853,722 B2 | 2/2005 | Joseph et al. | |
| 7,373,304 B1 | 5/2008 | Pletz et al. | |
| 8,447,837 B2 * | 5/2013 | Devanneaux | H04L 67/02 709/203 |
| 8,718,262 B2 | 5/2014 | Conway et al. | |
| 8,718,272 B2 | 5/2014 | Desai et al. | |
| 8,750,489 B2 | 6/2014 | Park | |
| 8,774,369 B2 | 7/2014 | Xing et al. | |
| 2002/0023139 A1 * | 2/2002 | Hultgren | G06F 17/30902 709/216 |
| 2003/0112959 A1 | 6/2003 | Mori | |
| 2003/0195940 A1 * | 10/2003 | Basu | G06F 17/30902 709/213 |
| 2006/0083219 A1 * | 4/2006 | Paden | H04L 12/5692 370/352 |
| 2006/0230236 A1 * | 10/2006 | Finkelstein | G06F 12/0862 711/137 |
| 2010/0191658 A1 * | 7/2010 | Kannan | G06F 17/279 705/304 |
| 2011/0282670 A1 * | 11/2011 | Chiu | G06Q 20/209 704/270 |
| 2011/0295649 A1 | 12/2011 | Fine et al. | |
| 2012/0039460 A1 | 2/2012 | Krishnapuram et al. | |

(Continued)

Primary Examiner — William Deane, Jr.

(57) ABSTRACT

Methods, non-transitory computer readable media and devices are disclosed for caching data associated with a second state in a customer service interaction call flow when a first state in the customer service interaction call flow is reached. For example, a method includes a processor for initiating a customer service transaction associated with a customer service interaction flow in response to a communication from a user, determining that a first state in the customer service interaction flow is reached during the customer service transaction, calculating that a likelihood of needing data associated with a second state in the customer service interaction flow during the customer service transaction exceeds a threshold, retrieving, from a data store, data associated with the second state, and storing data associated with the second state in a cache.

20 Claims, 5 Drawing Sheets

(56) References Cited

U.S. PATENT DOCUMENTS

| | | | |
|---|---|---|---|
| 2012/0303526 A1* | 11/2012 | Csoka | G06Q 20/10 705/44 |
| 2013/0156171 A1* | 6/2013 | Springer | H04M 1/64 379/88.22 |
| 2013/0294593 A1* | 11/2013 | Xing | G06Q 30/0241 379/114.13 |
| 2014/0079195 A1 | 3/2014 | Srivastava et al. | |
| 2014/0270147 A1 | 9/2014 | Williams et al. | |
| 2015/0271287 A1* | 9/2015 | Islam | H04L 67/2847 711/137 |
| 2015/0295988 A1* | 10/2015 | Goodwin | H04L 67/1095 709/203 |
| 2015/0358460 A1* | 12/2015 | Monegan | H04M 3/493 379/88.01 |

\* cited by examiner

JUST-IN TIME DATA POSITIONING FOR CUSTOMER SERVICE INTERACTIONS

The present disclosure relates generally to customer service interaction flows and, more particularly, to a method, computer readable medium, and device for caching data associated with a second state in a customer service interaction call flow when a first state in the customer service interaction call flow is reached.

BACKGROUND

There is a vast amount of customer service interaction (CSI) data generated based on look-up services. Data involved in customer service interactions may be generated and stored on a variety of disparate customer-facing and back-office systems. A customer may interact with a particular system that may retrieve local data as well as remote data on other systems in order to process the customer service interaction. Typically, customer service interactions are initiated by telephone, e.g., to an interactive voice response system (IVR) or via an online inquiry. In either case, the customer service interaction follows an automated or semi-automated flow through a series of defined states. In some states, retrieval of data may be necessary to complete a task of the state or to complete the customer service interaction. The retrieval of data may require calls to one or more other systems, and involve the time to make the call, and the time waiting for a response, all of which may result in dissatisfaction of the customer.

SUMMARY

In one embodiment, the present disclosure provides a method, computer readable medium, and device for caching data associated with a second state in a customer service interaction call flow when a first state in the customer service interaction call flow is reached. For example, a method includes a processor for initiating a customer service transaction associated with a customer service interaction flow in response to a communication from a user, determining that a first state in the customer service interaction flow is reached during the customer service transaction, for calculating that a likelihood of needing data associated with a second state in the customer service interaction flow during the customer service transaction exceeds a threshold, for retrieving, from a data store, data associated with the second state, and for storing the data associated with the second state in a cache.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, non-transitory (i.e., tangible or physical) computer readable storage media, and devices for pre-positioning customer service interaction data in advance of a predicted need, and more specifically to caching data associated with a second state in a customer service interaction call flow when a first state in the customer service interaction call flow is reached. Notably, there is a vast amount of customer service interaction data generated based on look-up services. In accordance with the present disclosure, a customer service interaction (CSI) follows an automated or semi-automated flow through a series of defined states or points (e.g., a CSI flow). In some states, retrieval of data may be necessary to complete a task of the state or to complete the customer service interaction. The retrieval of data may require calls to one or more other systems, and involve the time to make the call, and the time waiting for a response, all of which may result in dissatisfaction of the customer.

The present disclosure aims to perform subsequent steps of a data look-up pattern or flow proactively, without waiting for customer input and without waiting for back office systems to push the data forward through replication. In one embodiment of the present disclosure, past usage of CSI flows are tracked and quantified. By following the sequence of events for a plurality of prior traversals of a CSI flow, the present disclosure determines what percentage of the time a second state in the CSI flow is reached when a prior first state in the CSI flow is reached, or more generally, what percentage of the time a call is made to retrieve a set of data associated with the second state when the first state has previously been reached, or when a call associated with the first state has previously been made. Data that is required for the second state can then be retrieved ahead of time. For example, the present disclosure provides programs, logic or instructions to cause asynchronous calls to be made to retrieve the data needed for the second state, before the decision point and before it is determined that the data is absolutely necessary. When data is needed, it has already been queried and cached so the customer or a customer service representative does not need to wait for a long period of time to access the data.

As an example, a customer service interaction may involve a call to an interactive voice response (IVR) system. The automatic number identification (ANI) or caller identification (caller ID) of the customer can be tracked and used to look up account details. Using machine learning based upon past traversals of the CSI flow implemented by the IVR system, it may be known that customers are usually calling about a billing problem, and that billing details are often accessed in the traversals of the CSI flow. Therefore, for a new customer service transaction, i.e., a new traversal of the CSI flow, it may be assumed (with high probability) that information about billed/unbilled entries will be utilized. Thus, the present disclosure automatically retrieves the data that is anticipated to be necessary (e.g., account details, billing information), instead of waiting to the point in the CSI flow where it is determined with certainty that the data is in fact necessary. In one example, data is only pre-fetched at an earlier point in a CSI flow if it is determined that the likelihood of using the data at a later point in the CSI flow exceeds a threshold probability.

It should be noted that it is not possible to perform analytics on all data, all the time. In addition, data cannot all be moved at once. Therefore, the present disclosure also identifies critical information that may be used and prioritizes that particular set of data, versus moving all of the potential data that could be used for a traversal of a CSI flow. In other words, the present disclosure replicates a subset of the data that is the most relevant and most useful at a particular time. For example, a sample CSI flow that swaps equipment or a CSI flow to change rate plans would involve services for "inquire account profile," "inquire subscriber profile," and "inquire device profile." The service of "inquire account profile" may have more than 1000 attributes, only a handful of which relate to swapping equipment. Therefore, it is important to narrow down and select which subset of the account profile attributes to pre-fetch. Again, this is informed by machine learning based upon observations of past usage of the CSI flow.

In one example, the present disclosure may select data to cache based upon both "vertical" aspects as well as "horizontal" aspects of data replication. For instance, the "vertical" aspects relate to the statistical linkage of subsequent states in a CSI call flow with prior states, or more generally, to the statistical linkage of subsequent calls to retrieve data with prior calls, while the "horizontal" aspects relate to the overall number of times a particular subset of data is replicated between systems. For example, a back-office system storing data that may be utilized in connection with CSI flows may be the original repository for newly generated customer data. However, other back-office systems may often request this data. Thus, the present disclosure also quantifies and analyzes the history of calls to fetch particular subsets of data between and among these systems. In other words, the present disclosure may also look beyond correlations found in traversals of CSI flows to also consider function calls and data usage relating to cross-service conversations, business process orchestration, e.g., generating automatic bills for customers, producing trend and usage reports, and so forth. The most popular subsets of data are candidates for earlier replication into a cache of a requesting system, and may retain priority over other subsets of data for remaining in the cache when the cache is at or near capacity.

Figure 1:
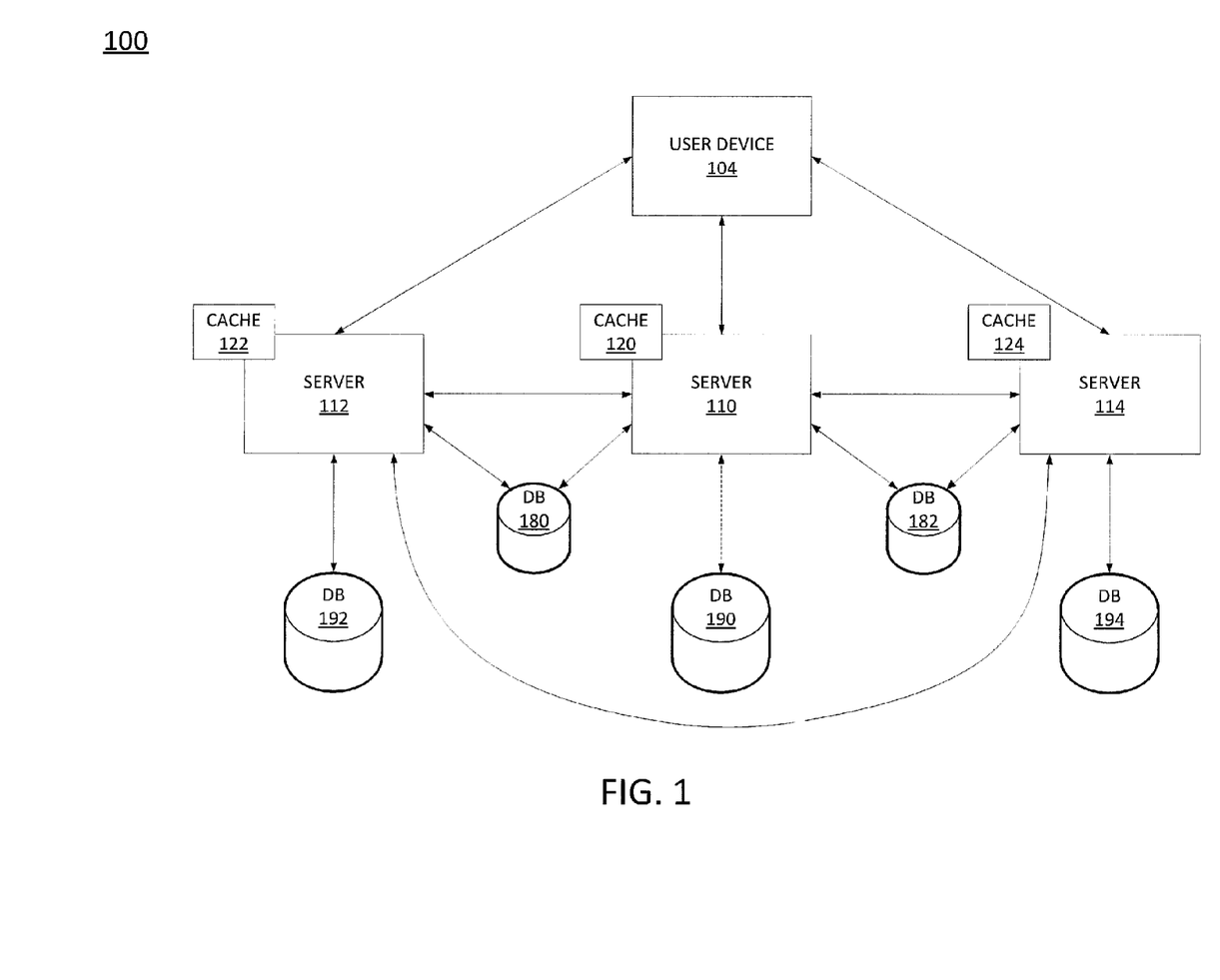
FIG. 1 illustrates one example of a system for customer service interactions, according to the present disclosure.

To aid in understanding the present disclosure, FIG. 1 illustrates a functional diagram of an example system 100 comprising a plurality of different servers 110, 112 and 114 for providing customer service interactions. Each of servers 110, 112 and 114 may have an associated database (DB) 190, 192 and 194, for storing customer data and other data that may be required to process customer service transactions. User device 104 may comprise a telephone, laptop computer, desktop computer, a smart phone, a soft phone, a VoIP phone, or other type of telephony or computing device of a user, e.g., a customer. In one example, the user may engage in customer service transactions with any one of the servers 110, 112 or 114. In particular, servers 110, 112 and 114 may provide the same or different customer service interaction (CSI) flows. For example, server 110 may comprise an interactive voice response (IVR) system for processing telephone inquiries from users, while server 112 may comprise a web-server for processing users' online inquiries.

Data generated in connection with customer service transactions involving server 110 may be initially stored in DB 190. Data generated in connection with customer service transactions involving servers 112 and 114 may be initially stored in DBs 192 and 194, respectively. Notably, data stored in DBs 190, 192 and 194 may be replicated among the DBs via data movements between servers 110, 112 and 114, respectively. For instance, a customer may update a home address via a customer service transaction with server 112. The home address data may then be synchronized among several storage locations through a push notification from server 112, or during a periodic data synchronization operation, e.g., a nightly or weekly event. In one example, data may also be replicated to one or more centralized databases 180 and 182, as indicated by the connections between severs 110 and 112 with DB 180 and the connections between servers 110 and 114 with DB 182.

Each of the servers 110, 112 and 114 may also comprise an associated data cache 120, 122 and 124. The data caches 120, 122 and 124 may comprise temporary storage locations for the most useful, the most important and/or the most current data that may be required to process customer service transactions. In one example, the local caches 110, 112 and 114 may comprise high-speed memories such as double data rate synchronous dynamic random access memory (DDR SDRAM), quad data rate synchronous dynamic random access memory (QDR SDRAM), and so forth, whereas the databases 180, 182, 190, 192 and 194 may comprise one or more arrays of hard disk drives, optical drives and so forth that are accessed via slower interfaces.

In one example, server 110 may be processing a customer service transaction involving user device 104. Server 110 may also determine that the customer service transaction has reached a particular state in the CSI flow and may calculate that it is more than "X" percent likely that another state in the CSI flow will be reached. In addition, server 110 may determine that a particular set of data would be required in the event that the subsequent state in the CSI flow is reached during the customer service transaction, and that the subset of the data is stored in one or more of DB 192 and DB 194. Thus, server 110 may make calls to server 112 and/or server 114 to retrieve the set of data from DB 192 and/or DB 194. Upon receipt of the requested data, the data may then be stored in cache 120. As an alternative, or in addition, server 110 may: (1) determine that a particular function call is being made at a first state of the CSI flow, (2) determine that it is more than "X" percent likely that a call to retrieve a set of data associated with one or more other states of the CSI flow will eventually be made, and (3) make calls to server 112 and/or server 114 to retrieve the set of data from DB 192 and/or DB 194.

In addition, the customer service transaction involving user device 104 may just be one of hundreds of customer service transactions being handled by server 110. Thus, the data that is stored in cache 120 may be prioritized based upon a competitive algorithm that prioritizes more recently stored data over older data, that prioritizes more frequently requested data over less frequently requested data and/or that prioritizes common data over customer-specific data. Server 110 may also recalculate the perceived benefit of storing data in cache 120 as the customer service transaction moves from state to state throughout a CSI flow. For instance, if a first state of a CSI flow is reached during a customer service transaction and it is calculated that it is very likely that a second state will be reached, data associated with the second state may be retrieved by server 110 from another system and stored in cache 120. However, if a third state in the call flow is reached, and a historical analysis indicates that the second state is a very unlikely state to follow the third state, the cached data associated with the second state is a strong candidate to be flushed from cache 120, e.g., either by deleting the data from the memory locations in which the data is stored or by noting that the memory locations are free to be reassigned and overwritten.

It should be noted that the architecture of FIG. 1 is illustrative in nature and that various modifications to the system 100 are possible in accordance with the present disclosure. For example, databases 190, 192 and 194 may be integrated within servers 110, 112 and 114, respectively, or may comprise one or more separate storage devices which may be collocated with servers 110, 112 and 114, respectively (e.g., in a same subnet), or may be located remotely from servers 110, 112 and 114. Similarly, DB 190, DB 192 and DB 194 may comprise distributed file systems where each DB may extend across several diverse storage devices in different physical locations. In addition, as illustrated in FIG. 1, caches 120, 122 and 124 are illustrated as being components of servers 110, 112 and 114. However, in another example, any one of caches 120, 122 and 124 may be embodied by an independent device that may be in communication with the respective server 110, 112 or 114. Thus, these and other variations are all contemplated within the scope of the present disclosure.

Figure 2A:
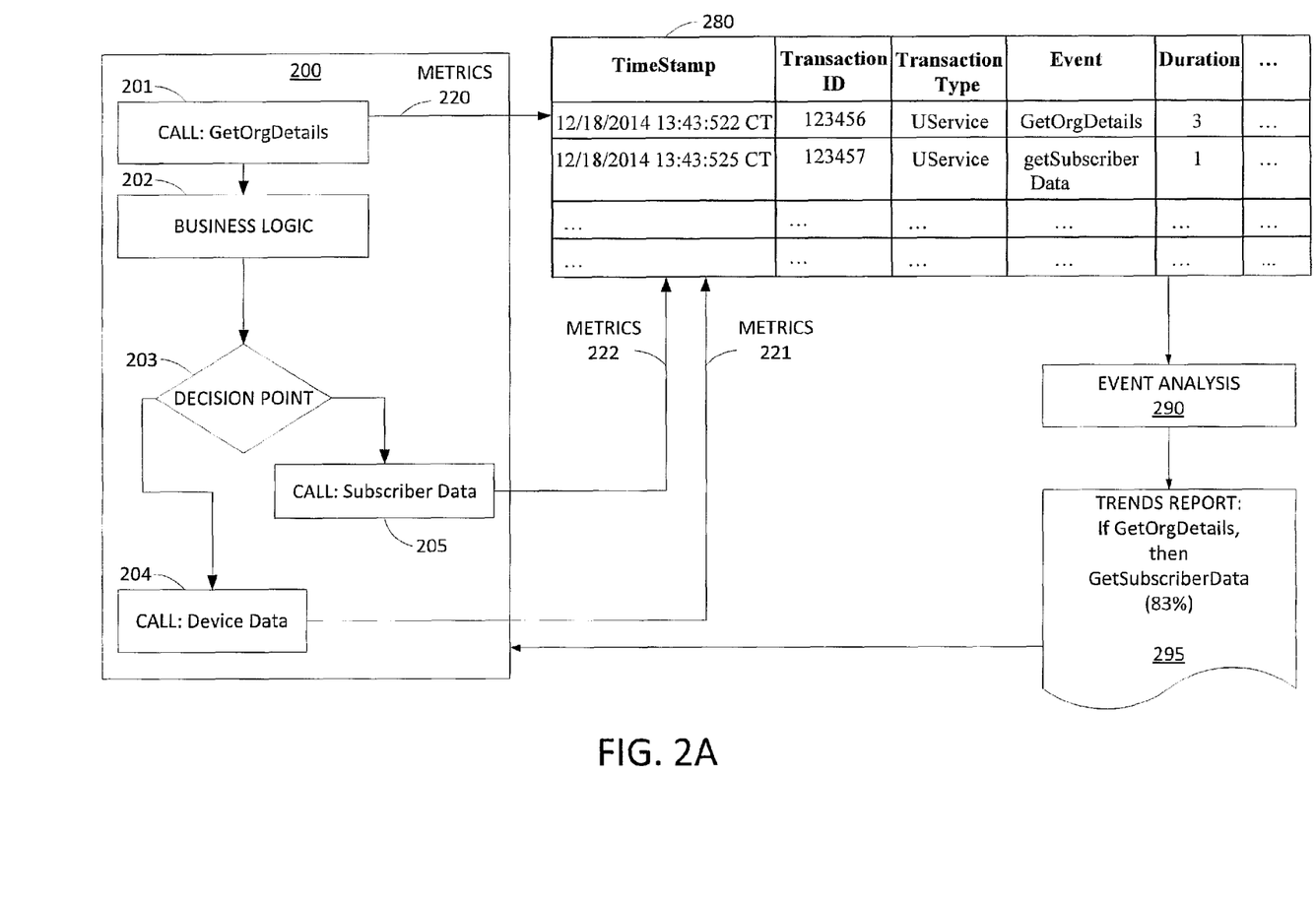
FIGS. 2A and 2B illustrate example customer service interaction call flows, according to the present disclosure.
Figure 2B:
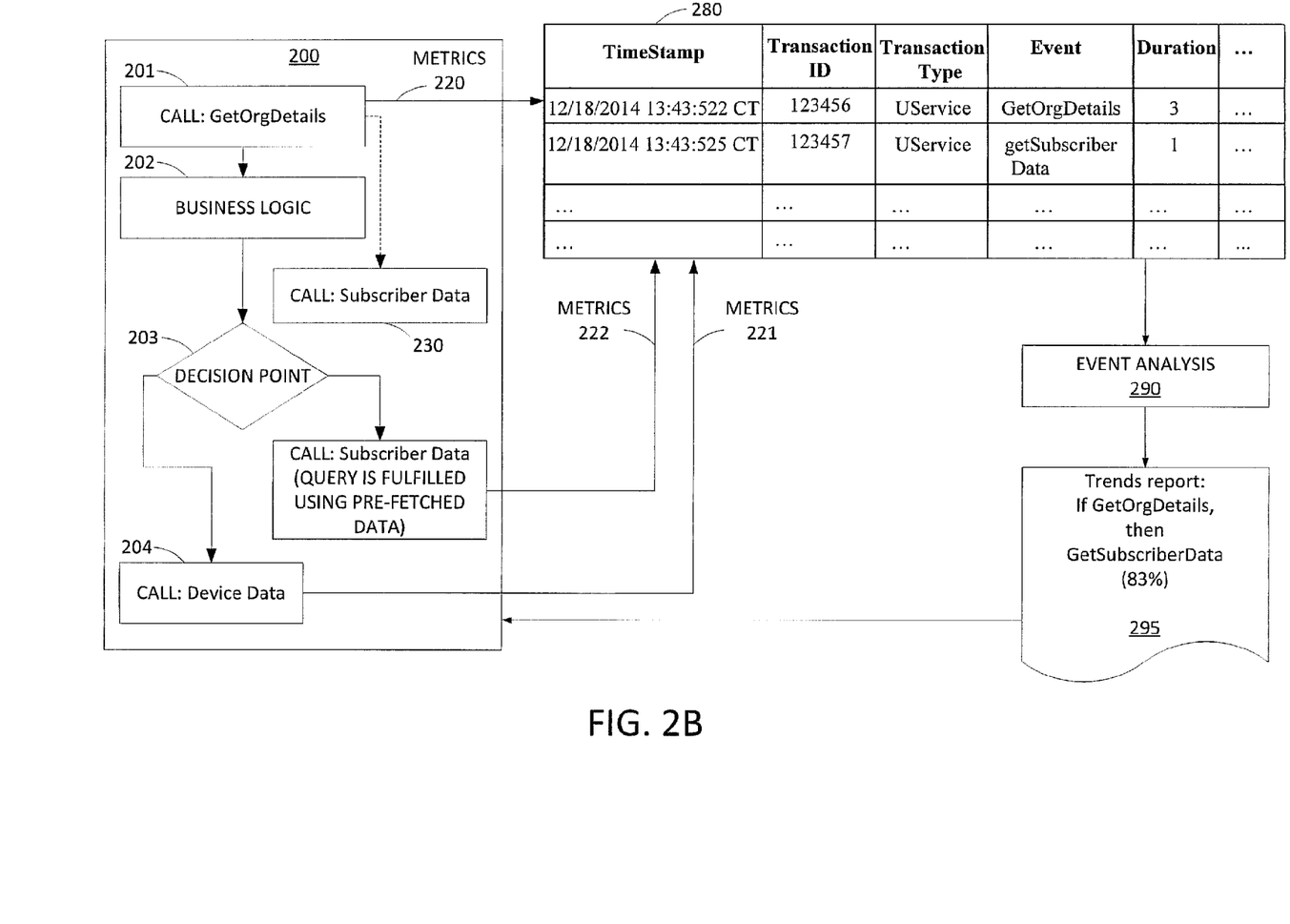

To further aid in understanding the present disclosure, FIGS. 2A and 2B illustrate an example CSI call flow 200, and a process for gathering usage metrics for generating historical trend data and updating of the CSI call flow to include one or more calls to pre-fetch data.

To illustrate, a simplified CSI flow 200 is shown in FIG. 2A. In one example, the CSI flow 200 may be implemented by one or more customer service interaction servers, e.g., one of the servers 110, 112 or 114 in FIG. 1. As part of the CSI flow 200, a first state 201 involves a call to retrieve "organization details" data. The call may comprise a call by the server implementing CSI flow 200 to one or more different servers and/or one or more remote data stores. Following state 201 is state 202 where the server executes business logic of the CSI flow 200. Notably, insofar as the CSI flow 200 has been simplified, state 202 may comprise a series of multiple states. Following state 202, a traversal of the CSI flow 200 may proceed to state 203, e.g., a decision point. From the decision point, a traversal of the CSI flow 200 may proceed to state 204 or state 205. At state 204 a call is made to retrieve "device data", whereas at state 205 a call is made to retrieve "subscriber data." As indicated by the arrows 220, 221 and 222, each of the calls made during a traversal of the CSI flow 200 may be time-stamped and stored in a log file 280. In addition, this process may be repeated over many traversals of the CSI flow 200 during different customer service transactions, or traversals, for multiple customers.

In one example, the server implementing CSI flow 200, or another server, performs an event analysis process 290 over the data stored in the log file 280. In one example, Bayesian and non-Bayesian techniques such as expectation maximization algorithms, k-means clustering, k-nearest neighbor, maximum entropy algorithms, term frequency-inverse document frequency (TF-IDF), and the like may be utilized to determine the degree of correlation between calls made during past traversals of the CSI flow 200. As a result, the server may produce a trend report 295 which is then used to update CSI flow 200. In this example, the trend report 295 indicates that if the call to get "organization details" is made, a subsequent call to get "subscriber data" is made 83 percent of the time. If this percentage exceeds a particular threshold that may be set by a system operator, then the CSI flow 200 may be automatically updated to include a call to get "subscriber data" at the same time that the call to get "organization details" is made. As an alternative, it may be considered that when state 201 is reached, state 205 is subsequently reached in CSI flow 200 during 83 percent of the traversals contributing data/metrics to the log file 280.

Referring now to FIG. 2B, the CSI flow 200 has been modified to include an additional state 230. In particular, state 230 comprises a call to get "subscriber data" at the same time that the call to get "organization details" is made at state 201. Although state 230 is illustrated as a separate state, as an alternative it may be considered that state 201 is modified to include both a call to get "organization details" and a call to get "subscriber data." Thus, during a traversal of the modified CSI flow 200 of FIG. 2B, if decision point/state 203 is reached and it is determined to proceed to state 205, the call to retrieve "subscriber data" has already been made to a remote system. Thus, the "subscriber data" can be fulfilled from a local cache where the "subscriber data" has already been stored via the call of state 230.

Figure 3:
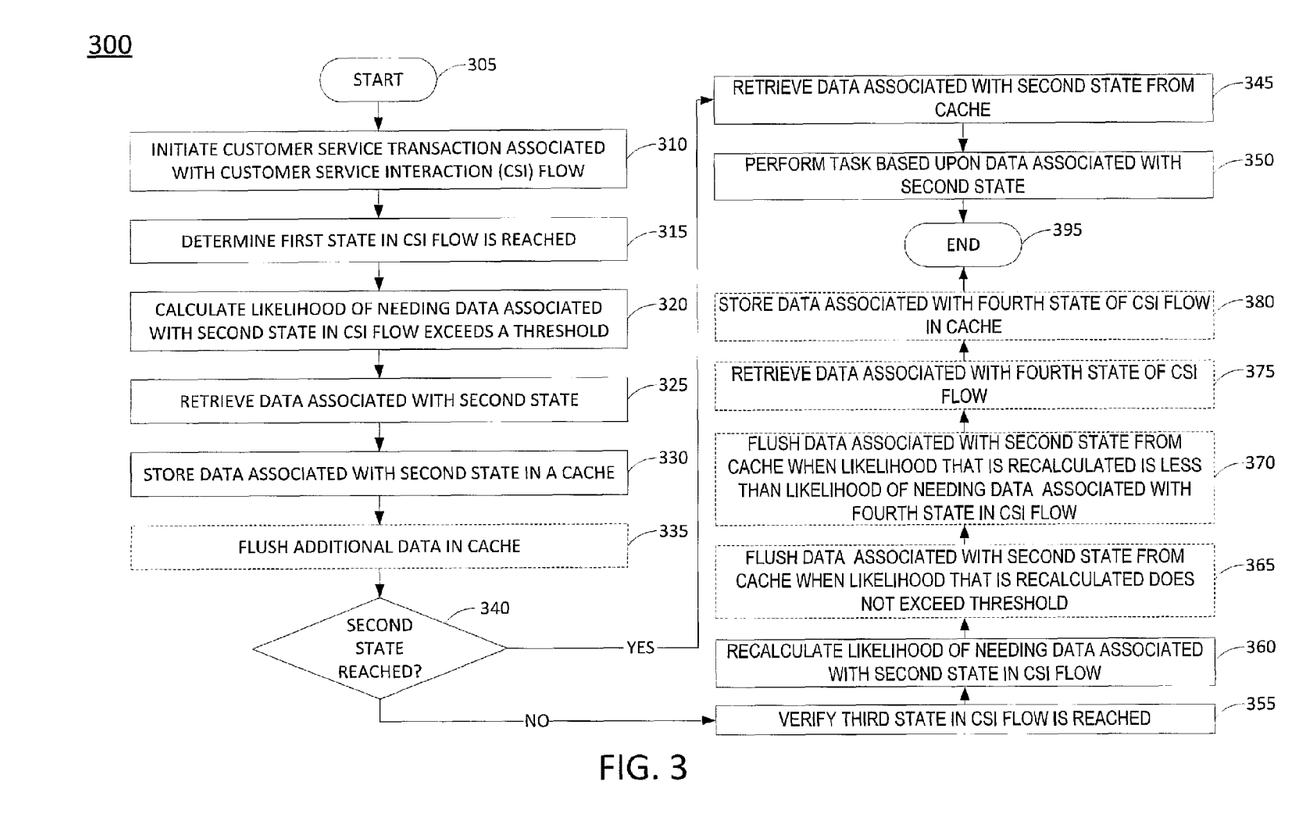
FIG. 3 illustrates an example flowchart of a method for caching data associated with a second state in a customer service interaction call flow when a first state in the customer service interaction call flow is reached, according to the present disclosure.

FIG. 3 illustrates an example flowchart of a method 300 for caching data associated with a second state in a customer service interaction call flow when a first state in the customer service interaction call flow is reached. In one embodiment, the steps, operations or functions of the method 300 may be performed by any one or more of the components of the system 100 depicted in FIG. 1. For example, in one embodiment, the method 300 is performed by the server 110. In another embodiment, the method 300 is performed by the server 112 or 114. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although any one of the elements in system 100 may be configured to perform various steps, operations or functions of the method 300, the method will now be described in terms of an embodiment where steps of the method are performed by a processor, such as processor 402 in FIG. 4.

The method 300 begins at step 305 and proceeds to step 310. At step 310, the processor initiates a customer service transaction associated with a customer service interaction (CSI) flow in response to a communication from the user. For example, the processor may comprise a component of a server that provides an interactive voice response system or web-based CSI flow. In one example, the communication from the user may comprise a telephone call to the server. In another example, the communication may comprise an online inquiry from a device of the user. In one example, the CSI flow may comprise a plurality of linked states, where each state may further comprise a number of calls to retrieve data and to perform various tasks associated with each state.

At step 315, the processor determines that a first state in the CSI flow is reached. As referred to herein, the term "first state" does not refer to the initial state of the CSI flow, but refers to any state at which the method 300 may be invoked to make a decision as to whether to retrieve and store data associated with a later state in the CSI flow that may potentially be reached during the customer service interaction. When it is determined that the first state is reached, the following steps 320, 325 and 330 are performed. In one example, step 320, 325 and 330 are performed or commenced without waiting for the CSI flow to proceed to a different state. In accordance with the present disclosure, the first state may comprise a plurality of calls to perform one or more tasks that define the first state. The calls may comprise calls to obtain data from a remote data store, or remote data stores, calls to manipulate such data, calls to present audible or visual information to the user, or calls to perform numerous other functions.

At step 320, the processor calculates that a likelihood of needing data associated with a second state in the CSI flow exceeds a threshold. In one example, the likelihood is based upon a historical analysis of a plurality of previous customer service transactions, or traversals of the CSI flow. In one example, the historical analysis comprises determining a percentage of the plurality of previous customer service transactions in which the first state is reached and the second state is later reached. Notably, the percentage that is determined may comprise the likelihood calculation that is then compared to the threshold. The threshold may be set by an operator of the system. In addition, the threshold may be adjusted from an initial value based upon a current capacity of a cache associated with the processor, based upon a workload of the processor, and so forth.

Alternatively, or in addition, the historical analysis may track the different calls (e.g., system and function calls, as contrasted with incoming telephone calls from users) that are made at each state during a traversal of the CSI flow and store these calls and their time stamps in a log file. Thus, the log file may be used to determine trends that correlate calls to retrieve data from remote systems with calls that occur earlier in time in a particular traversal of the CSI flow. In one example, Bayesian and non-Bayesian techniques such as expectation maximization algorithms, k-means clustering, k-nearest neighbor, maximum entropy algorithms, term frequency-inverse document frequency (TF-IDF), and the like may be utilized to determine the degree of correlation between these calls. In the present example, the first state may involve a particular call "X" that is determined to be 70 percent correlated with a later call "Y" that retrieves data from a remote system.

As an alternative, or in addition to the determination of a likelihood of reaching a second state in the CSI flow, step 320 may involve a determination that the likelihood that a subsequent call "Y" will need to be made exceeds a threshold. In other words, in one example step 320 does not need to directly determine whether or not a particular second state in the CSI flow is likely to be reached. Rather, based upon a determination that call "X" is made, it may be determined that call "Y" is sufficiently likely to follow at some point in the traversal of the CSI flow. For instance, it may be the case that not just one subsequent state in the CSI flow includes the call "Y." There may be several possible subsequent states that include the call "Y" such that, when considered as a whole, the likelihood that call "Y" follows call "X" is, for example, 70 percent. Thus, while call "Y" may comprise data associated with a second state of the CSI flow, the call "Y" may also be associated with additional states beyond the second state that also utilize the same data.

In one example, the historical analysis may consider the last 1,000 customer service transactions, the last 10,000 customer service transactions, or some other defined quantity of transactions preceding the current customer service transaction. In another example, the historical analysis may consider customer service transactions within a defined period of time prior to the current customer service transaction, e.g., within the last four hours, within the past day, within the past week, and so forth. Notably, different events may trigger changes in the usage patterns of the traversals of the CSI flow. For instance, if a current offer is being made, there is a large scale problem affecting many users, etc., there may be a large number of users calling about the same issue. However, after a certain time, the importance of the issue may subside and the usage patterns of the CSI flow may change. Thus, by considering usage data within a certain recent time period or with respect to a most recent number of traversals, the historical analysis prioritizes data associated with current issues and de-prioritizes data that is less timely.

At step 325, the processor retrieves the data associated with the second state. In particular, one or more calls to retrieve the data associated with the second state may be added as an additional state in the CSI flow following the first state, or may be added as a call to any existing logic implemented in connection with the first state. In one example, the retrieval comprises a call to a remote storage system, i.e., a data store, to obtain the data associated with the second state. Notably, the data store may comprise a single data store, e.g., a single device at a single location, or many comprise multiple diverse devices at the same location or distributed among a plurality of different locations.

At step 330, the processor stores the data associated with the second state in a cache. In one example, the cache comprises a cache that is local to the processor performing the method 300, e.g., integrated within the same device, or attached to the same device. In one example, "local" indicates that the cache is closer, in terms of access time or distance, to the processor than the data store from which the data associated with the second state was retrieved. In one example, the local cache is also configured to be accessed at higher data rates than the data store. For example, the local cache may comprise double data rate synchronous dynamic random access memory (DDR SDRAM), quad data rate synchronous dynamic random access memory (QDR SDRAM), and so forth, whereas the data store may comprise one or more arrays of hard disk drive, optical drive and so forth that are accessed via slower interfaces.

At optional step 340, the processor flushes an additional data set in the cache. For example, as the CSI flow reaches the first state, a data set (also referred to simply as "data") previously stored in the cache may become stale or of a lower priority than the data associated with the second state. For instance, the previous data stored in the cache may have been placed there in anticipation of its later use. However, insofar as the CSI flow has now reached the first state, the first state and the path of the current traversal through the CSI flow may make clear that the data that was previously stored in the cache is unlikely to now be needed. In one example, the processor may compare the calculation of the percent likelihood that the data associated with the second state will be needed against calculations for various data sets previously stored in the cache. The data set with the lowest calculation may be flushed from the cache, e.g., by deleting the data or by freeing the memory locations to be overwritten or reassigned. In one example, the calculations for data sets previously stored in the cache may be time weighted, such that as more time passes, the percent likelihood calculation for each set of data continues to decline as compared to the calculation when each data set was originally stored in the cache.

At step 340, the processor determines if the second state in the CSI flow is reached. If the second state is reached, the method 300 proceeds to step 345. Otherwise, the method 300 proceeds to step 355.

At step 345, the processor retrieves data associated with the second state from the cache. In particular, while previously the second state in the CSI flow would involve a call to the data store to retrieve the data, the processor may more quickly access the data associated with the second state that has been written to the local cache.

At step 350, the processor performs at least one task based upon the data associated with the second state. For instance, the data associated with the second state may comprise current discount offers for the user, where the second state involves the presentation of such discount offers to the user via the user's telephone or computing device. In another example, the data associated with the second state may comprise current account balance information, where the second state may involve the task of presenting the account balance to the user. In another example, the task may comprise calculations involving the data associated with the second state, or manipulations of the data, which may or may not include a presentation of the data to the user.

Following step 350, the method 300 proceeds to step 395 where the method ends. However, if at step 340 it is determined that the second step is not reached, the method 300 proceeds to step 355.

At step 355, the processor verifies that a third state in the CSI flow is reached during the customer service transaction. In the present context, the label of "third" does not necessarily imply that the third state is later in the CSI flow than the first and second states. In addition, more complex CSI flows may involve loops, cross-over paths, returns to previous states, e.g., for bi-directionally linked states, and so forth. Thus, in general, the third state comprises any state other than the first state and the second state.

At step 360, the processor recalculates a likelihood of needing the data associated with the second state in the CSI flow. In particular, historical analysis of past traversals of the CSI flow may indicate that following the third state, or following one or more calls of the third state, there is only a 30 percent likelihood of needing the data associated with the second state. Thus, in moving from the first state to the third state, the likelihood of needing the data associated with the second state has declined from a 70 percent probability to a 30 percent probability.

At optional step 365, the processor flushes the data associated with the second state from the cache when the likelihood of needing the data associated with the second state that is recalculated at step 360 falls below the threshold (e.g., the same threshold that is implemented at step 320). Although not required, if the cache has sufficient spare capacity, it may be beneficial in other situations to free memory space in the cache for additional data to be stored that is more likely to be used.

At optional step 370, the processor may apply additional or alternative criteria to determine whether to flush the data associated with the second state from the cache. For instance, if the cache is at or near capacity, the processor may need to prioritize the storage of different sets of data. To illustrate, the processor may calculate that a likelihood of needing data associated with a fourth state in the CSI flow is greater following the third state than a likelihood of needing the data associated with the second state. In addition, the likelihood of needing the data associated with the second state may be less than the likelihoods for all other sets of data. Thus, the data associated with the second state may be flushed from the cache to make room for any data associated with the fourth state.

At optional step 375, the processor retrieves data associated with the fourth state. For example, step 375 may comprise one or more calls made in a similar manner to step 325 to retrieve the data associated with the fourth state from the remote data store.

At optional step 380, the processor then stores in the cache the data associated with the fourth state that has been retrieved. Following step 380, the method 300 proceeds to step 395 where the method ends.

In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application.

Furthermore, steps, blocks, functions or operations in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

The present disclosure may be extended to several additional embodiments. For instance, in another example step 370 may comprise comparing the likelihood of needing the data associated with the second state with likelihood calculations pertaining to data that is already stored in the cache or that may be retrieved and stored in the cache, but which relate to customer service transactions of other users. In another example, steps 325 and 330 may only be performed if the threshold of step 320 is reached and the data associated with the second state has previously been retrieved in prior CSI flow traversals greater than a second threshold number of times. For instance, while it may be highly likely that the current user will need the data associated with the second state in connection with the current customer service transaction, the total number of times this data is accessed may be particularly low. Thus, as an additional criteria, the method 300 may exclude storing the data associated with the second state in the cache because it is relatively unimportant as compared to more popular data, e.g., data that has been retrieved for numerous other users in connection with past customer service transactions.

In one example, the decision of whether to retrieve and cache a particular set of data may be based upon a composite score generated from various component scores. For instance, a first portion of the composite score may be based upon a likelihood that the set of data will be utilized in a current customer service transaction based upon historical CSI flow traversal analysis. Another portion of the composite score may be based upon a number of times that the second set of data has been retrieved within a defined period of time (i.e., how popular the data is). Another portion of the composite score may be based upon whether the data comprises customer-specific data or comprises general data that is applicable to all customers or to multiple customers. The foregoing are several examples of potential factors upon which a composite score may be based. Thus, it should be noted that the composite score may be expanded to include additional factors, or may be modified to account for different factors than those described in the present example.

In calculating the composite score, each of the factors may be populated with a numerical value and modified by a weight as exemplified by equation 1 where, when a CSI flow is at a state "i", "C" is the composite score, D is the data being scored, each "F" represents a value for a factor and each "W" comprises a corresponding weight to apply to the value:

$$C_i(D) = (F_1 \times W_1) + (F_2 \times W_2) + (F_3 \times W_3) + \ldots + (F_n \times W_n) \quad \text{EQUATION 1}$$

Thus, for example, $F_1$ may comprise a percent likelihood that a second state requiring data will be reached when the transaction is at state "i" of the CSI flow, e.g., a value of 80, for 80 percent. $W_1$ may comprise a weight of 0.7. Thus, the first factor may contribute a value of 56 to the composite score (i.e., since 80×0.7=56). The other factors may be similarly accounted for in the calculation of the composite score $C_i(D)$. It should be noted that the values of the different factors may be first manipulated into a common scale. However, this particular step is not required.

Upon the calculation of the composite score, the present disclosure may utilize the composite score in various ways. For example, the present disclosure may simply compare the composite score to a threshold that is set by an operator of the system. If the threshold is exceeded, then the data "D" will be retrieved and stored in a cache. In another example, the composite score for the data "D" may be compared to scores for other sets of data to prioritize which data is stored in the cache, e.g., where the cache is at or near capacity.

Thus, in one embodiment, the present disclosure may retrieve and cache data associated with a second state when a CSI flow reaches a first state based upon a calculation of a percent likelihood that the second state will be reached following the first state. However, in another embodiment, the data associated with the second state may be retrieved and cached during a first state when a composite score for the data associated with the second state exceeds a threshold.

In another example, the retrieval and storage of the data associated with the second state may be delayed even if it is determined that it is highly likely the data associated with the second state will be needed. For example, the method 300 may wait until the traversal of the CSI flow is closer to the second state. Thus, the data associated with the second state may still be pre-fetched prior to reaching the second state, but will not compete for space in the cache until a later time, such that other data previously stored in the cache and that may still be used is not prematurely flushed. These operations may comprise similar operations to those discussed above in connection with steps 335, 365 or 370.

In another embodiment, the capacity of the cache may be divided into several bins. For example, a large portion of the cache may be reserved for data that is generally applicable to all users or to a plurality of users, whereas each user initiating a customer service transaction may be reserved a smaller individual portion of the cache's capacity to store customer/user-specific data. Thus, if it is determined to pre-fetch general data during a user's customer service interaction, this data may be counted against the capacity of the cache for general data, whereas if it is determined to pre-fetch data that is only relevant to the particular user, it will be counted against the user's individual storage limit. Therefore, the cache does not grow unbounded.

In addition, as mentioned above the present disclosure may consider both "vertical" aspects of data replication based upon historical usage of CSI flows, and "horizontal" aspects of data replication based upon historical trends of data movement or replication among different systems, both for reasons of processing traversals of CSI flows, as well as for other reasons such as those relating to cross-service conversations, business process orchestration, e.g., generating automatic bills for customers, producing trend and usage reports, and so forth.

Thus, in combining the "vertical" and "horizontal" aspects of the present disclosure, in one example the likelihood calculations relating to steps 320, 360 and 370 of the method 300 may be further based upon a historical analysis that looks beyond previous traversals of the CSI flow. For instance, it may be determined that when customer location information is replicated from one storage location to another, it is often the case that a call is also made to retrieve current marketing offers. The cause of this correlation may be that the system is configured to updated current marketing offers when the location of the user is updated. Although these calls are not related to a particular CSI flow, this historical usage of these function calls by back office systems may contribute to the metrics that correlate or tie two functions calls together. Thus, these and other variations are all contemplated within the scope of the present disclosure.

As such, the present disclosure provides at least one advancement in the technical field of interactive voice response (IVR) systems and other customer service interaction (CSI) systems. This advancement is in addition to the traditional methods of retrieving data from storage locations on an as-needed basis. In particular, the present disclosure anticipates the need for data, prior to the actual need being manifest, and makes asynchronous calls to pre-fetch the data such that it is more readily available if and when the need becomes a reality. This leads to more efficient customer service interactions, better throughput of the CSI system, and greater customer satisfaction.

The present disclosure also provides a transformation of data, e.g., historical CSI flow traversal records are generated, stored and analyzed, and are transformed into additional data or new data that characterizes correlations between earlier calls in the CSI flow and later calls to retrieve data. The correlations are further transformed into data to modify the CSI flow to include asynchronous calls to retrieve data at a point in the CSI flow prior to an actual need for the data.

Finally, embodiments of the present disclosure improve the functioning of a computing device, e.g., a server. Namely, a server for providing an interactive voice response (IVR) system, or for providing an online CSI flow, is improved by the use of information automatically obtained with respect to historical CSI flow traversal records, thereby providing a more robust CSI process where data is pre-positioned in a cache based upon anticipated need, and where the data stored in the cache is continuously reevaluated to store the most relevant data this is deemed likely to be necessary as a traversal of the CSI flow progresses.

Figure 4:
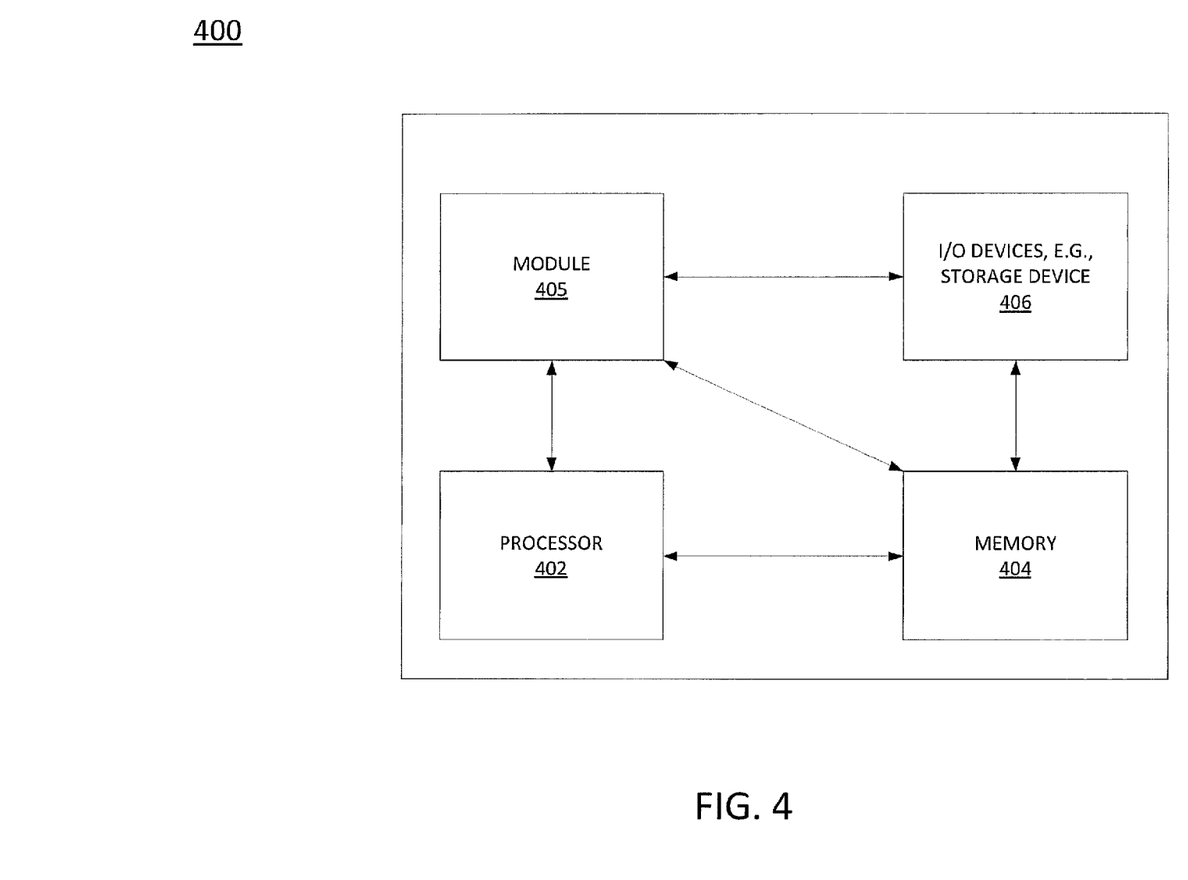
FIG. 4 illustrates a high-level block diagram of a computing device specially programmed for use in performing the functions described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for caching data associated with a second state in a customer service interaction call flow when a first state in the customer service interaction call flow is reached, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

The one or more hardware processors 402 can also be configured or programmed to cause other devices to perform one or more operations as discussed above. In other words, the one or more hardware processors 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one embodiment, instructions and data for the present module or process 405 for caching data associated with a second state in a customer service interaction call flow when a first state in the customer service interaction call flow is reached (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for caching data associated with a second state in a customer service interaction call flow when a first state in the customer service interaction call flow is reached (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
   initiating, by a processor of an interactive voice response system, a customer service transaction associated with a customer service interaction flow of the interactive voice response system in response to a communication from a user, wherein the communication comprises a call;
   determining, by the processor, that a first state in the customer service interaction flow is reached during the customer service transaction;
   calculating, by the processor, without an input from the user to enter a second state of the customer service interaction flow, that a likelihood of needing data associated with the second state in the customer service interaction flow during the customer service transaction exceeds a threshold, wherein the calculating is based upon a historical analysis of a plurality of previous customer service transactions involving the customer service interaction flow, wherein the historical analysis determines a percentage of the plurality of previous customer service transactions in which a call associated with the first state is made and is followed by a retrieval of the data associated with the second state;
   retrieving, by the processor from a data store, the data associated with the second state, the data associated with the second state being necessary to complete a task associated with the second state or to complete the customer service transaction, the data associated with the second state comprising device data or subscriber data; and
   storing, by the processor, the data associated with the second state in a cache, wherein the calculating, the retrieving and the storing are performed while the customer service transaction remains in the first state.

2. The method of claim 1, wherein the customer service interaction flow comprises a plurality of linked states, the plurality of linked states including the first state and the second state.

3. The method of claim 1, wherein the customer service interaction flow comprises a flow of a web-based customer service interaction system.

4. The method of claim 1, wherein the cache comprises a local cache of the processor.

5. The method of claim 1, wherein the data store comprises a storage system that is remote from the processor.

6. The method of claim 5, wherein the data store comprises a plurality of different storage locations.

7. The method of claim 1, further comprising:
   retrieving the data associated with the second state from the cache when the customer service transaction reaches the second state; and
   performing the task associated with the second state based upon the data associated with the second state that is retrieved.

8. The method of claim 7, wherein the task comprises:
   presenting the data associated with the second state to the user.

9. The method of claim 1, wherein the retrieving is performed when the likelihood of needing the data associated with the second state exceeds the threshold, and when a number of times that the data associated with the second state has been retrieved in the plurality of previous customer service transactions exceeds an additional threshold.

10. The method of claim 1, further comprising:
    deleting data previously stored in the cache when the data associated with the second state is stored in the cache, wherein the data previously stored in the cache that is deleted is data with an oldest time stamp as compared to other data stored in the cache.

11. The method of claim 1, further comprising:
verifying that a third state in the customer service interaction flow is reached;
recalculating the likelihood of needing the data associated with the second state; and
flushing the data associated with the second state from the cache when the likelihood of needing the data associated with the second state that is recalculated does not exceed the threshold.

12. The method of claim 1, further comprising:
verifying that a third state in the customer service interaction flow is reached;
recalculating the likelihood of needing the data associated with the second state;
calculating a likelihood of needing data associated with a fourth state in the customer service interaction flow; and
flushing the data associated with the second state from the cache when the likelihood of needing the data associated with the second state that is recalculated is less than a likelihood of needing the data associated with the fourth state.

13. The method of claim 12, further comprising:
retrieving data associated with the fourth state from the data store; and
storing the data associated with the fourth state in the cache.

14. The method of claim 13, wherein the recalculating is performed when there is insufficient capacity in the cache to store both the data associated with the second state and the data associated with the fourth state.

15. A non-transitory computer-readable medium storing instructions which, when executed by a processor of an interactive voice response system, cause the processor to perform operations, the operations comprising:
initiating a customer service transaction associated with a customer service interaction flow of the interactive voice response system in response to a communication from a user, wherein the communication comprises a call;
determining that a first state in the customer service interaction flow is reached during the customer service transaction;
calculating without an input from the user to enter a second state of the customer service interaction flow, that a likelihood of needing data associated with the second state in the customer service interaction flow during the customer service transaction exceeds a threshold, wherein the calculating is based upon a historical analysis of a plurality of previous customer service transactions involving the customer service interaction flow, wherein the historical analysis determines a percentage of the plurality of previous customer service transactions in which a call associated with the first state is made and is followed by a retrieval of the data associated with the second state;
retrieving, from a data store, the data associated with the second state, the data associated with the second state being necessary to complete a task associated with the second state or to complete the customer service transaction, the data associated with the second state comprising device data or subscriber data; and
storing the data associated with the second state in a cache, wherein the calculating, the retrieving and the storing are performed while the customer service transaction remains in the first state.

16. A device, comprising:
a processor of an interactive voice response system; and
a non-transitory computer-readable medium storing instructions which, when executed by the processor, cause the processor to perform operations, the operations comprising:
initiating a customer service transaction associated with a customer service interaction flow of the interactive voice response system in response to a communication from a user, wherein the communication comprises a call;
determining that a first state in the customer service interaction flow is reached during the customer service transaction;
calculating without an input from the user to enter a second state of the customer service interaction flow, that a likelihood of needing data associated with the second state in the customer service interaction flow during the customer service transaction exceeds a threshold, wherein the calculating is based upon a historical analysis of a plurality of previous customer service transactions involving the customer service interaction flow, wherein the historical analysis determines a percentage of the plurality of previous customer service transactions in which a call associated with the first state is made and is followed by a retrieval of the data associated with the second state;
retrieving, from a data store, the data associated with the second state, the data associated with the second state being necessary to complete a task associated with the second state or to complete the customer service transaction, the data associated with the second state comprising device data or subscriber data; and
storing the data associated with the second state in a cache, wherein the calculating, the retrieving and the storing are performed while the customer service transaction remains in the first state.

17. The device of claim 16, the operations further comprising:
verifying that a third state in the customer service interaction flow is reached;
recalculating the likelihood of needing the data associated with the second state; and
flushing the data associated with the second state from the cache when the likelihood of needing the data associated with the second state that is recalculated does not exceed the threshold.

18. The device of claim 16, the operations further comprising:
verifying that a third state in the customer service interaction flow is reached;
recalculating the likelihood of needing the data associated with the second state;
calculating a likelihood of needing data associated with a fourth state in the customer service interaction flow; and
flushing the data associated with the second state from the cache when the likelihood of needing the data associated with the second state that is recalculated is less than a likelihood of needing the data associated with the fourth state.

19. The device of claim 18, the operations further comprising:
   retrieving data associated with the fourth state from the data store; and
   storing the data associated with the fourth state in the cache.

20. The device of claim 19, wherein the recalculating is performed when there is insufficient capacity in the cache to store both the data associated with the second state and the data associated with the fourth state.

* * * * *